(12) United States Patent
Kim

(10) Patent No.: US 12,449,453 B2
(45) Date of Patent: Oct. 21, 2025

(54) ARC DETECTOR HAVING MULTI-BAND FREQUENCY DETECTION FUNCTION

(71) Applicant: K-ENERGY SYSTEM CO., LTD., Wonju-si (KR)

(72) Inventor: Eung Seok Kim, Wonju-si (KR)

(73) Assignee: K-ENERGY SYSTEM CO., LTD., Wonju-si (KR)

( * ) Notice: Subject to any disclaimer, the term of this patent is extended or adjusted under 35 U.S.C. 154(b) by 209 days.

(21) Appl. No.: 18/351,455

(22) Filed: Jul. 12, 2023

(65) Prior Publication Data
US 2023/0358794 A1 Nov. 9, 2023

Related U.S. Application Data

(63) Continuation of application No. PCT/KR2022/018556, filed on Nov. 23, 2022.

(30) Foreign Application Priority Data

Mar. 8, 2022 (KR) .................. 10-2022-0029105

(51) Int. Cl.
*G01R 23/02* (2006.01)
*G01R 31/58* (2020.01)

(52) U.S. Cl.
CPC .............. *G01R 23/02* (2013.01); *G01R 31/58* (2020.01)

(58) Field of Classification Search
CPC .... G01R 23/02; G01R 31/1272; G01R 31/58; G01R 1/00; G01R 3/00; G01R 5/00; G01R 7/00; G01R 9/00; G01R 11/00; G01R 13/00; G01R 15/00; G01R 17/00; G01R 19/00; G01R 21/00; G01R 22/00; G01R 23/00; G01R 25/00; G01R 27/00; G01R 29/00; G01R 31/00; G01R 33/00; G01R 35/00
See application file for complete search history.

(56) References Cited

FOREIGN PATENT DOCUMENTS

| JP | 2006517672 A | * | 2/2004 | ............ G01R 31/59 |
|---|---|---|---|---|
| KR | 10-1358020 B1 | | 2/2014 | |
| KR | 10-2014-0033768 A | | 3/2014 | |
| KR | 10-1454203 B1 | | 11/2014 | |

(Continued)

OTHER PUBLICATIONS

Request for the Submission of an Opinion for 10-2022-0029105 by Korean Intellectual Property Office dated Mar. 29, 2022.

(Continued)

*Primary Examiner* — Judy Nguyen
*Assistant Examiner* — Brent J Andrews
(74) *Attorney, Agent, or Firm* — BROADVIEW IP LAW, PC

(57) ABSTRACT

The present invention proposes an arc detector having a multi-band frequency detection function, which divides an arc frequency band using multiple band-pass filters and detects whether or not an arc occurs in each of the divided frequency bands, thereby eliminating switching noise or power supply noise that mainly occurs in a certain frequency band, and consequently increasing the accuracy of arc detection. In addition, the arc detector of the present invention may minimize the use of expensive analog-to-digital converters and increase the accuracy of arc detection through overlapping area detection.

7 Claims, 5 Drawing Sheets

(56) References Cited

FOREIGN PATENT DOCUMENTS

| | | | | |
|---|---|---|---|---|
| KR | 20170015595 A | * | 2/2017 | ............. G01R 31/12 |
| KR | 10-2017-0078479 A | | 7/2017 | |
| KR | 10-2409588 B1 | | 6/2022 | |

OTHER PUBLICATIONS

International Search Report for PCT/KR2022/018556 by Korean Intellectual Property Office dated Mar. 3, 2023.

* cited by examiner

ARC DETECTOR HAVING MULTI-BAND FREQUENCY DETECTION FUNCTION

CROSS-REFERENCE TO RELATED APPLICATIONS

This application is a Continuation Application of PCT Application No. PCT/KR2022/018556, filed on Nov. 23, 2022, which claims priority to Korean Patent Application No. 10-2022-0029105, filed on Mar. 8, 2022, in Korean Intellectual Property Office, the entire contents of which are hereby incorporated by reference in its entirety.

TECHNICAL FIELD

The present invention relates to an arc detector having a multi-frequency band detection function, and particularly, to an arc detector having a multi-frequency band detection function, which can minimize false detection generated due to switching noise or inverter noise similar to an arc, by dividing an arc frequency band where arcs occur into a plurality of frequency bands and detecting arcs in each band.

BACKGROUND ART

An arc is strong light and heat emitted when current flows using a gas as a medium between two physically separated electrodes.

The arc may be largely classified into a series arc that occurs within a conductor, a parallel arc that occurs between two conductors, and a ground arc that occurs between the ground and a conductor.

Here, the series arc is an arc fault that occurs when a line or connection of contact points through which current should normally flow is weakened. Since such a series arc does not form a zero point in the current, self-extinguish is difficult and thus risk is high, and in addition, there is a difficulty in detecting the fault.

As such, the series arc fault may occur due to aging of a line, poor contact of a connector, or the like. In the case of a series arc fault like this, although a fault occurs, it is difficult to detect the fault with a general overcurrent circuit breaker or earth leakage circuit breaker since the magnitude of the fault current is within a normal operating range.

DISCLOSURE OF INVENTION

Technical Problem

Therefore, the present invention has been made in view of the above problems, and it is an object of the present invention to provide an arc detector having a multi-frequency band detection function, which can minimize false detection generated due to switching noise or noise generated during power conversion, by dividing an arc frequency band where arcs occur into a plurality of frequency bands and detecting whether the same arc is generated in each divided band.

Another object of the present invention is to provide an arc detector having a multi-frequency band detection function, which minimizes use of an expensive analog-to-digital converter (ADC) having a high processing speed, by detecting arcs using a band-pass filter and a comparator in the arc frequency band.

Technical Solution

To accomplish the above object, according to one aspect of the present invention, there is provided an arc detector connected to a line and having a multi-frequency band detection function, which divides a frequency band into a plurality of detection bands and detects an arc by applying a low-pass filter, at least one band-pass filter, and a high-pass filter for frequency bands where generation of an arc is expected.

Advantageous Effects

According to the present invention, quality of electricity flowing through a line can be monitored at all times.

In addition, according to the present invention, switching noise or power supply noise that mainly occur only in a certain frequency band can be excluded and accuracy of arc detection can be improved by dividing the arc frequency band using a plurality of band-pass filters and detecting whether an arc is generated in each of the divided frequency bands.

In addition, according to the present invention, using an expensive analog-to-digital converter, which operates at a high speed while applying bandpass for each of a plurality of frequencies, is minimized. Through this, as arc detection is separately processed in each frequency band, performance can be further increased while reducing the manufacturing cost of the arc detector having a multi-frequency band detection function.

BEST MODE FOR CARRYING OUT THE INVENTION

The arc frequency band mentioned in this specification may refer to all frequency bands. However, in this specification, it will be described mainly focusing on an embodiment of 0 to 150 kHz for easy understanding and convenience. It should be noted in advance that the arc frequency band is not limited by the embodiments mentioned in this specification.

The band-pass filter mentioned in this specification may generally refer to all of a low-pass filter, a band-pass filter, and a high-pass filter based on the arc frequency band. Unless specified otherwise, it may refer to all of a low-pass filter, a band-pass filter, and a high-pass filter, and when separately mentioned, it may be separately described by referring to as a low-pass filter or a high-pass filter instead of a band-pass filter.

Hereinafter, the present invention will be described in detail with reference to the drawings.

Figure 1:
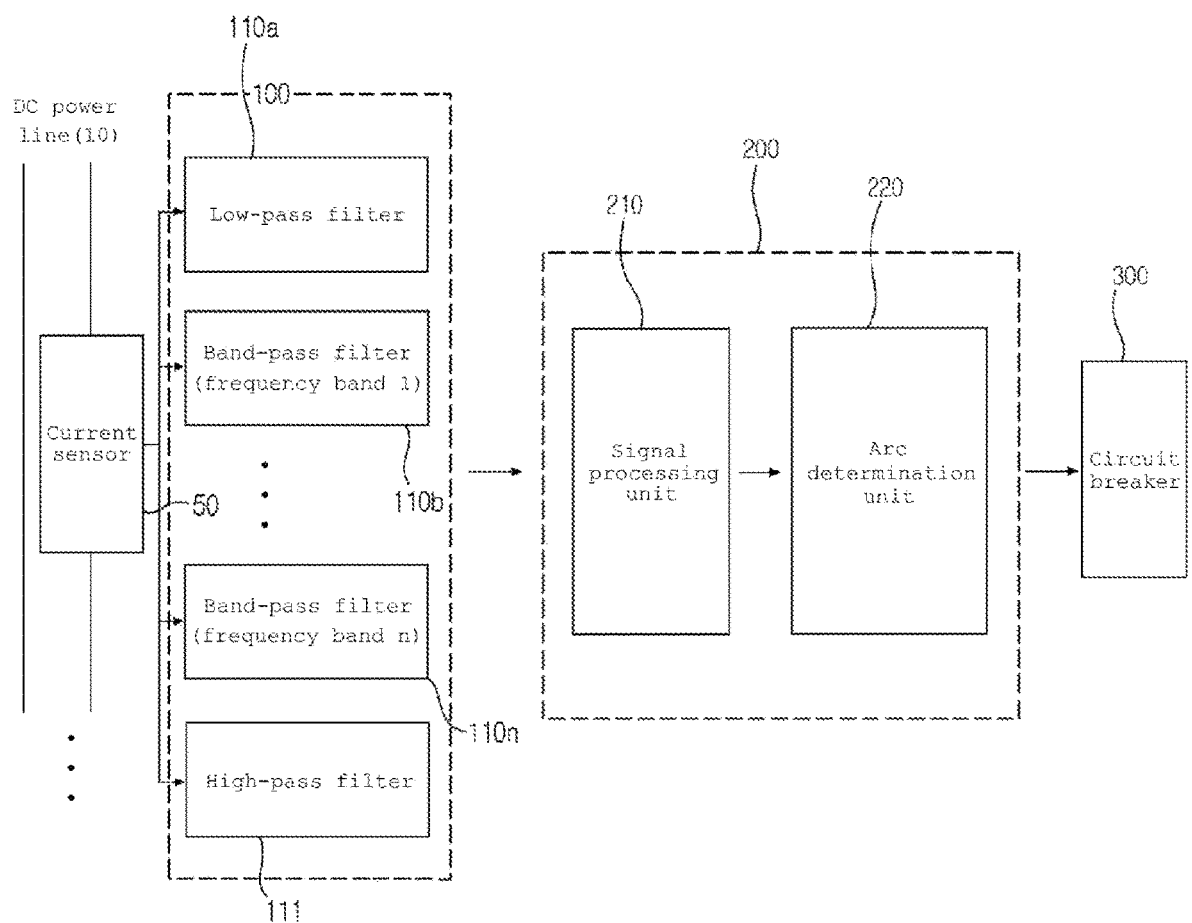
FIG. 1 shows a block diagram of an arc detector having a multi-frequency band detection function according to an embodiment of the present invention.

FIG. 1 shows a block diagram of an arc detector having a multi-frequency band detection function according to an embodiment of the present invention.

Referring to FIG. 1, an arc detector having a multi-frequency band detection function according to an embodiment may be configured to include a current sensor 50, a band detection unit 100, a calculation unit 200, and a circuit breaker 300, and the calculation unit 200 may be configured of a signal processing unit 210 and an arc determination unit 220.

The current sensor 50 may be configured of current measuring devices, such as a shunt resistor, a current transformer (CT) sensor, a hall sensor, and the like.

The current sensor 50 is directly connected to any one of a pair of lines 10. The current sensor 50 calculates a value of current flowing through the line 10 with reference to a value of voltage generated by the current measuring device. In addition, the current sensor 50 may provide a voltage value corresponding to the current generated by the current measuring device to the band detection unit 100.

The band detection unit 100 detects arcs on the basis of the voltage value of the current flowing through the line 10 through the current sensor 50. The band detection unit 100 divides the arc frequency band into a plurality of detection bands, and includes a low-pass filter 110a, band-pass filters 110b to 110n, or a high-pass filter 111 according to each detection band.

The arc frequency band according to the embodiment may divide the frequency band according to each paragraph described below.

1) Low frequency band: 0 to 40 khz
2) Frequency band of band-pass filter: 40 to 100 khz
3) High frequency band: 100 khz or higher In this embodiment, the low frequency band corresponds to a frequency band in which arcs are generated most strongly. In addition, it corresponds to a frequency band in which switching noise occurs most frequently.

It may be configured to distinguish arcs and non-arc impulses by separately performing frequency conversion for the low frequency band using an analog-to-digital converter and Fourier transform or Fast Fourier transform. The low-pass filter 110a is provided in the low frequency band, and this will be described below.

The band of the band-pass filter corresponds to 40 to 100 khz, and there is one frequency band, or the frequency band may be divided into two or more. In FIG. 1, band-pass filters correspond to reference numerals 110b to 110n.

The high frequency band corresponds to a frequency band of 100 khz or higher, and the high-pass filter 111 is in charge of arc detection.

Although arcs generated from a line occur in all frequency bands of low-frequency band, high-frequency band, and band-pass filters, there is a difference in that the arc occur across the entire arc frequency band, unlike switching noise or impulse that occurs only in a specific frequency band.

Meanwhile, frequency bands of the low-pass filter 110a, the band-pass filters 110b to 110n, and the high-pass filter 111 may be independent or partially overlapped with each other. This will be described with reference to FIGS. 2 to 4 together.

Figure 2:
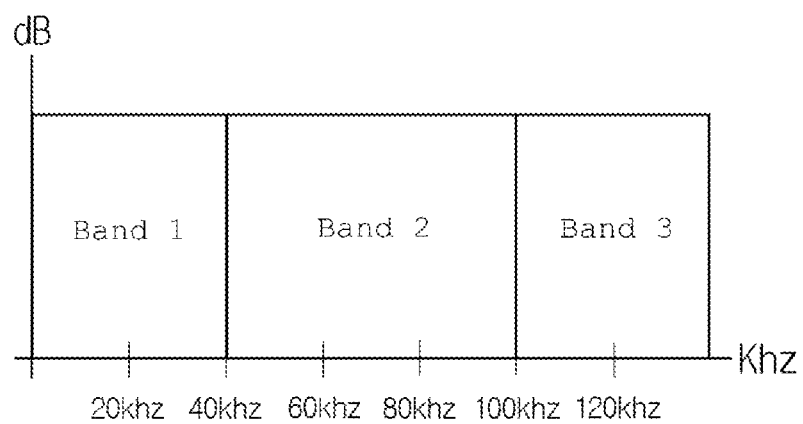
FIG. 2 shows a reference diagram according to an example in which frequency bands of a low-pass filter, a band-pass filter, and a high-pass filter are clearly distinguished.

FIG. 2 shows an example in which the frequency bands of the low-pass filter 110a, the band-pass filters 110b to 110n, and the high-pass filter 111 are clearly distinguished.

In FIG. 2, it can be seen that the low-pass filter 110a passes only the frequencies in a band of 0 to 40 khz, the band-pass filters 110b to 110n pass only the frequencies in a band of 40 to 100 khz, and the high-pass filter 111 passes only the frequencies in a band of 100 khz or higher.

Success or failure of a method of clearly dividing the arc frequency band by the low-pass filter 110a, the band-pass filters 110b to 110n, and the high-pass filter 111 may be determined according to completeness of filter gain of the band-pass filters. It can be seen that the gain of the low-pass filter 110a decreases as the frequency increases, and the gain at point a1 is decreased to a half of the maximum value. Accordingly, when an arc is generated in a frequency band corresponding to the point a1 in the low-pass filter 110a, the maximum signal value of the generated arc may be received in a state reduced as much as about a half.

It can be seen that the gain of the band-pass filters 110b to 110n greatly decreases at a frequency lower than a frequency corresponding to point a2 and higher than a frequency corresponding to point a2'. Although the band-pass filters 110b to 110n may guarantee a good reception gain in the frequency band between points a2 and a2', when an arc is generated at a frequency lower than point a2 or higher than point a2', the received signal value of an arc is greatly reduced and may not be determined as an arc.

The high-pass filter 111 shows gain characteristics in which the gain at a frequency lower than point a3 is lower than the maximum value. When an arc is generated at a frequency corresponding to point a3 or lower, it is worried that the maximum signal value of the generated arc is determined too low and to be identified as an arc.

Signal gains of the low-pass filter 110a, the band-pass filters 110b to 110n, and the high-pass filter 111 have been described. To solve this problem, the applicant of the present invention proposes a method of adjusting frequency bands allocated to the low-pass filter, the high-pass filter, and the band-pass filters 110a to 111 through FIGS. 3 and 4.

Figure 3:
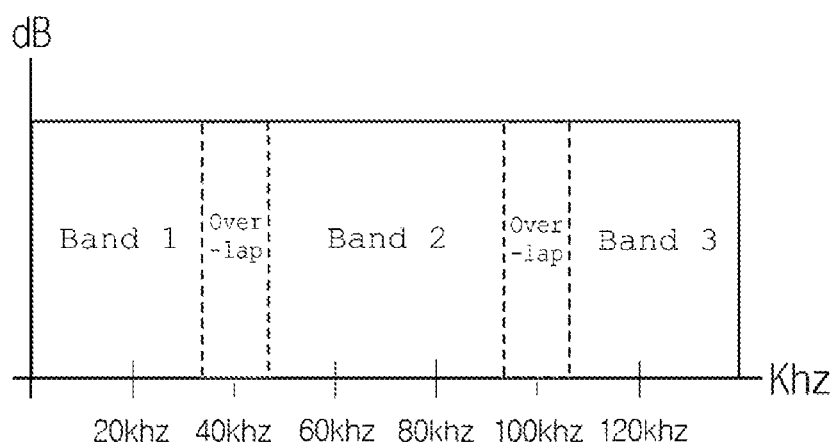
FIG. 3 shows a reference diagram according to an example configured to overlap the pass frequency band of the band-pass filter with neighboring frequency bands.

Referring to FIG. 3 together, the band of a filter for an arc frequency band may be implemented in a form overlapped with neighboring frequency bands.

As shown in FIG. 3, the frequency band may be divided and allocated so that the low-pass filter 110a may perform filtering in a frequency band of 0 to 45 khz, the band-pass filters 110b to 110n may perform filtering in a frequency band of 35 to 110 khz, and the high-pass filter 111 may perform filtering in a frequency band of 90 khz or higher.

The low-pass filter 110a is further extended compared to the frequency band shown in FIG. 2 to filter a frequency band of 0 to 45 khz. It has an effect of extending point a1 to the right side on the frequency axis, and it is the same as that the frequency band of the low-pass filter is widened.

As the high-pass filter 111 is further extended toward the low-frequency band compared to the frequency band shown in FIG. 2 to pass frequencies in a band of 90 khz or higher, a signal gain of the original frequency band of 100 khz can be secured.

In FIG. 3, band 1 and band 2 have an overlapped frequency area. Although the frequency band of the low-pass filter 110a is in charge of band 1 and the overlapped band b1, the arc frequency band is divided so that the band-pass filters 110b to 110n may also receive frequencies in the overlapped band b1. In the same way, the band-pass filters 110b to 110n are configured to filter frequencies in the overlapped area b2 of the frequency band corresponding to band 2 and the frequency band covered by the high-pass filter 111. Accordingly, frequencies in the overlapped bands b1 and b2 are filtered to be overlapped with the frequencies filtered by the filters that process neighboring frequency bands, and arc detection may be determined in all bands without a frequency band that is lost in arc detection.

Figure 4:
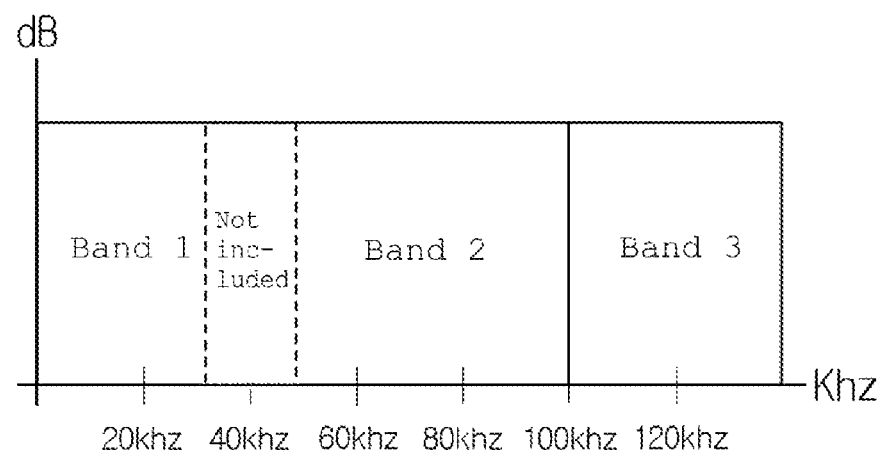
FIG. 4 shows a reference diagram according to an example of excluding arc detection for a frequency band in which switching noise or impulse frequently occurs.

Meanwhile, the detection band may be configured in a form that excludes a specific frequency band as shown in FIG. 4.

FIG. 4 shows a reference view according to an example of excluding arc detection in a frequency band in which switching noise or impulse frequently occurs.

In FIG. 4, the frequency band of 30 to 50 khz is excluded from arc detection, and this is due to generation of unnecessary noise that may be falsely detected as an arc in the frequency band of 30 to 50 khz in an electrical device to which the arc detector having a multi-frequency band detection function according to an embodiment is applied. This is to prevent the arc detector not to perform false detection by excluding a frequency band, in which noise generated by a load connected to the line 10 exists, from arc detection.

The method of excluding a frequency band from the detection band shown in FIG. 4 is determined according to the noise characteristics of the overall electrical system, and the illustrated frequency band (30 to 50 khz) may vary according to an electric device to which the arc detector having a multi-frequency band detection function according to this embodiment is connected.

Until now, characteristics of the low-pass filter 110a, the band-pass filters 110b to 110n, and the high-pass filter 111 have been described. Hereinafter, the other configurations of the band detection unit 100 will be described.

First, the low-pass filter 110a acquires a frequency band corresponding to a low frequency band among the sensing values of the current sensor 50 and transfers the acquired frequency band to the arc determination unit 220.

The output values of the band-pass filters 110b to 110n are individually provided to the signal processing unit 210. In FIG. 1, the signal processing unit 210 may compare the output values of the band-pass filters 110b to 110n with a reference value set by a user and output a comparison result value. In addition, the output values of the band-pass filters 110b to 110n may be compared with a plurality of reference voltages, rather than one reference voltage, and individual comparison values may be generated.

When the purpose is detecting an arc, it may be configured to compare the output value of the band-pass filter 110b with one reference voltage to determine whether an arc is generated.

The signal processing unit 210 may be configured to compare the output value of the band-pass filter 110b with the reference voltage, determine that an arc is generated when a voltage higher than the reference voltage is applied from the band-pass filter 110b, and output a logic value "1".

In the same way, the signal processing unit 210 may also compare the output value of the band-pass filter 110n with the reference voltage, and detect generation of an arc by outputting a logic value "1" when the output value is greater than the reference voltage as a result of the comparison.

This is the same in the case of the high-pass filter 111, and the signal processing unit 210 may compare the output value of the high-pass filter 111 with a reference voltage set for the high-pass filter 111, and detect generation of an arc by outputting logic "0" or "1" according to a result of the comparison.

In addition, the signal processing unit 210 may compare the output values of the filters 110b to 110n constituting the band detection unit 100 with different reference voltages to generate power quality evaluation data of the power flowing through the line 10, in addition to arc detection.

For example, the signal processing unit 210 may compare the output value of the band-pass filter 110b with reference voltage 1 to detect an arc, and compare the output value of the band-pass filter 110b with reference voltage 2, the reference voltage 3, and the reference voltage n to measure the quality of power passing through the line 10.

Here, the reference voltage (reference voltage 1) required for arc detection and the reference voltages (reference voltage 2 to reference voltage n) used for power quality measurement may be voltages different from each other, and it is preferable that the reference voltages are set to be lower than the arc voltage. This will be described with reference to FIGS. 5 and 6 together.

Figure 5:
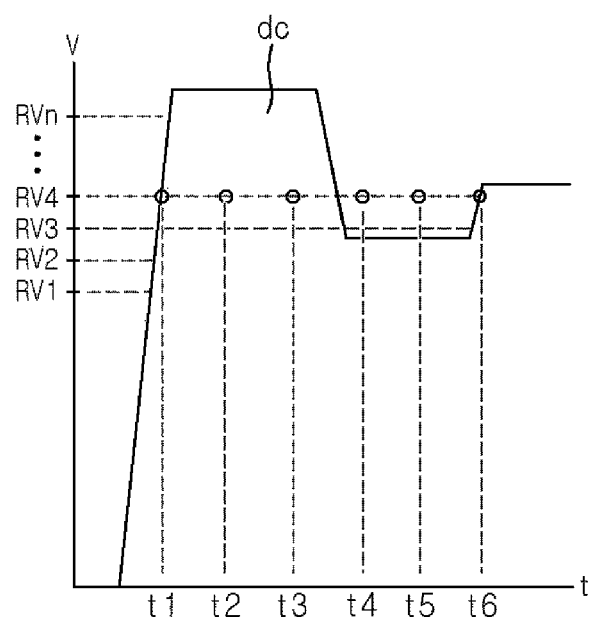
FIGS. 5 and 6 show an example of reference voltages set in a comparator connected to a band-pass filter.
Figure 6:
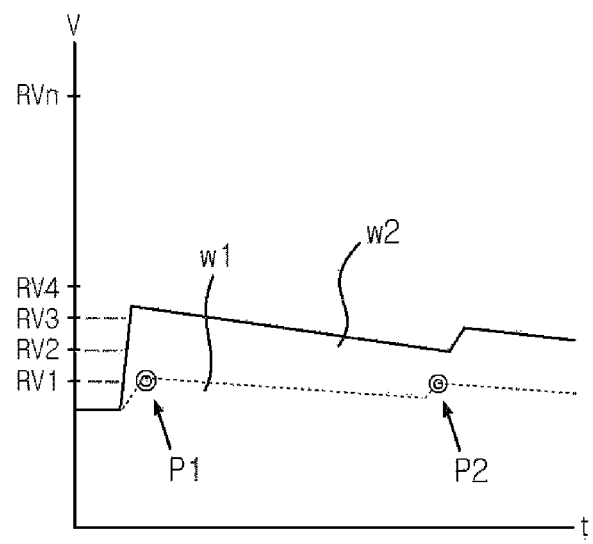

FIGS. 5 and 6 show an example of reference voltages compared to the output value of the band-pass filter 110b.

In FIG. 5, RV1 to RVn are shown as an example of the reference voltages of the signal processing unit 210, and it is assumed that reference voltage RV1 is used for arc detection, and it will be described on the assumption that the voltage passing through the line 10 is direct current dc.

The signal processing unit 210 matches a plurality of reference voltages RV1 to RVn and the direct current dc passing through the line 10 to determine a result of comparing with each of the reference voltages RV1 to RVn. When the direct current dc shows a waveform as shown in FIG. 5, the signal processing unit 210 will output a logic value "1" at t1, t2, and t3 with respect to reference voltage RV4, but output a logic value "0" at t4 and t5, and a logic value "1" at t6.

As logical values of 1, 1, 1, 0, 0, 1 are output as a result of comparison with reference voltage RV4 on the time axis t at regular time intervals, it means that the quality of the direct current dc is not uniform, and although it is assumed that the current value of the direct current dc is constant, it means that the quality of power flowing through the line 10 is lowered in proportion to the amount of change in the direct current dc.

Next, FIG. 6 shows another example of the waveform of direct current flowing through the line.

The waveform in FIG. 6 shows an example including power supply noise generated when AC is converted into DC.

Referring to FIG. 6, direct current w1 including power supply noise exceeds reference voltage RV1 at points P1 and P2, and is detected as logic value "1" when it is compared with reference voltage RV1.

However, in the results of comparison with the other reference voltages RV2 to RVn, direct current w1 is not detected as it is smaller than the other reference voltages RV2 to RVn.

On the other hand, in FIG. 6, direct current w2 is detected when it is compared with reference voltages RV1 to RV3 in the signal processing unit 210.

This means that switching noise with a maximum value higher than the expected basic voltage ref is continuously detected in direct current w2, and indicates that the quality of direct current w2 is lower than that of direct current w1.

The quality of direct current will be described with reference to FIGS. 7 and 8 together.

Figure 7:
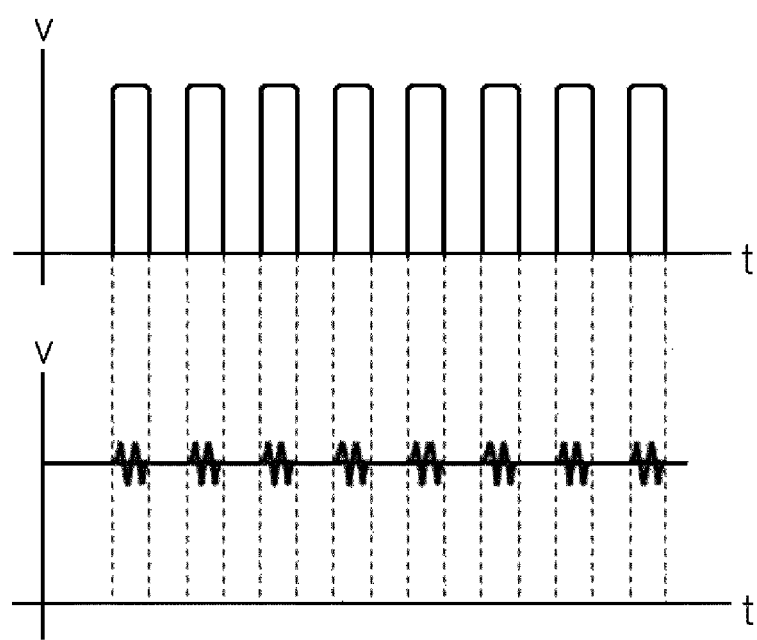
FIG. 7 shows an example of a switching waveform of a power supply connected to a line.

Among the two graphs shown in FIG. 7, the upper graph illustrates the switching waveform of a power supply connected to the line 10, and the lower graph illustrates the DC output current waveform of the power supply.

As shown in FIG. 7, the power supply that supplies direct current to the line 10 has a characteristic of repeatedly generating a pulse having a constant magnitude and frequency in the process of switching alternating current to convert it into direct current in a normal state in which no arc is generated. Whenever the alternating current is sliced, a current waveform of a triangular shape is introduced to the line 10, and such a current waveform is found in a specific frequency band (mainly generated in a 100 kHz band). Such a waveform that regularly generated with a constant magnitude in a specific frequency band does not need to be determined as an arc.

Figure 8:
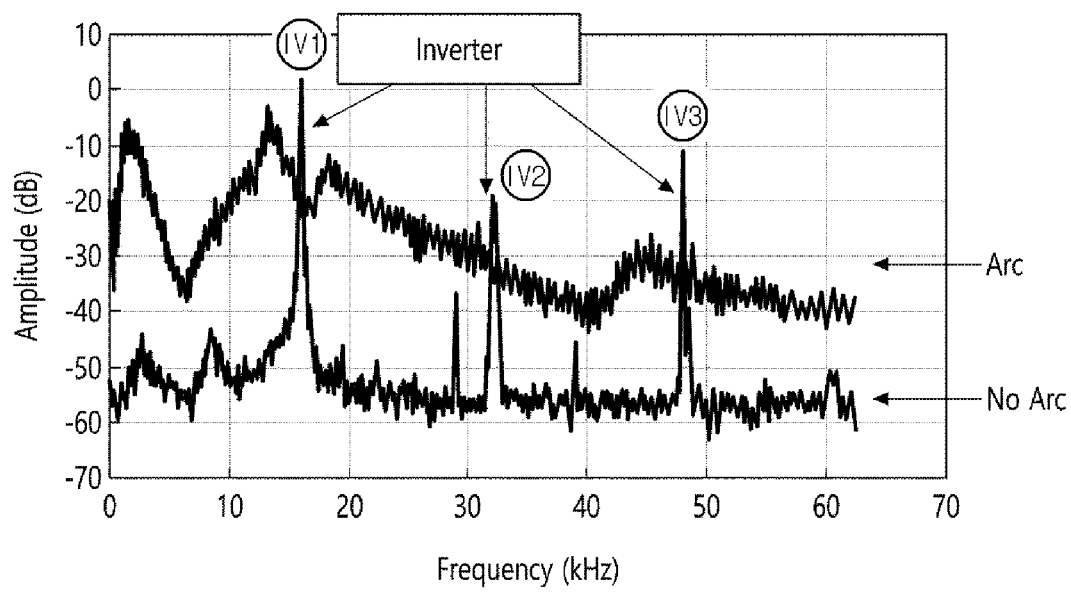
FIG. 8 shows an example of a signal in which arcs and inverter noises are mixed.

FIG. 8 shows an example of a signal in which arcs and inverter noises are mixed.

Referring to FIG. 8, it can be seen that an arc is generated in the entire arc frequency band, and the amplitude is particularly high in the low frequency band.

On the other hand, the switching noise generated by the inverter is observed only in the 15 khz, 33 khz, and 48 khz bands, and the amplitude is similar to that of an arc.

The reason why the switching noise that occurs in the inverter is generated in three places unlike those shown in FIG. 6 is that the inverter changes the switching period to maintain the output voltage.

When the quality of voltage flowing through the line 10, i.e., quality of power, varies severely, the inverter allows a constant voltage to flow through the line 10 while varying switching noise. However, when seeing the graph shown in FIG. 7 defined by the relation between frequency and amplitude, only three peak value amplitudes IV1, IV2, and IV3 are observed, and when defined by time axis and amplitude, only any one of the inverter's switching noises IV1, IV2, and IV3 is generated at an arbitrary time point, and the other two noises do not appear.

This means that only one switching noise is detected when the band detection unit 100 detects an arc over time in the arc frequency band. That is, the switching noise of the inverter is regarded as one impulse and is not generated in the entire frequency band of the arc frequency band.

The arc and non-arc waveforms flowing through the line 10 are described above with reference to FIGS. 7 and 8. Hereinafter, the arc determination unit 220 will be described.

The arc determination unit 220 compares a filtering result value of the band detection unit 100 with a plurality of reference voltages provided in the signal processing unit 210, and receives and counts a comparison result for each of the filters 110*a* to 111 provided in the band detection unit 100. For example, although the output value of the band-pass filter 110*b* may be compared with one reference voltage, arc detection and power quality measurement may be simultaneously performed by comparing with two or more reference voltages to measure power quality.

In each of the filters 110*a* to 111, the arc determination unit 220 may count the number of times of exceeding a reference voltage applied to each filter, and when the counted value exceeds a preset reference value, it may be determined that an arc is generated.

When only whether or not an arc is generated is determined, the arc determination unit 220 may determine whether an arc is generated by comparing the output value output from each of the filters 110*a* to 111 with a single reference voltage for determining an arc, and counting the number of times of generating logical value "1" as a result of the comparison.

Meanwhile, unlike the band-pass filters 110*b* to 110*n* or the high-pass filter 111, for the low-pass filter 110*a*, the signal processing unit 210 may perform analog-to-digital conversion.

A low band signal filtered by the low-pass filter 110*a* may be digitally converted through the analog-to-digital conversion and then provided to the frequency determination unit 241.

The signal processing unit 210 may first detect an estimated signal predicted as an arc signal on the basis of the magnitude and frequency of a pulse in an arc state by performing an FFT analysis on the current value sensed by the current sensor 50, and determine whether or not an arc is generated by comparing the magnitude and frequency of a pulse generated by a device (e.g., a power supply or an inverter) connected to the line 10 with those of the estimated signal.

The reason of separately performing an FFT analysis only for the low-pass filter 110*a* is that 4) the signal processing unit 210 having a comparison function may wrongly determine inverter noise or noise generated by a power supply as an arc, and 5) it is worried that noise generated by a load other than the power supply or inverter may be confused as an arc.

6) In addition, noise of a large amplitude may be generated periodically according to a load connected to the line 10, and the noise may be wrongly determined as an arc with only a structure of comparing an output value of the low-pass filter 110*a* with a reference voltage.

The arc determination unit 220 may determine whether an arc is generated by performing an FFT analysis on the signal FFT-processed by the signal processing unit 210, or determine whether an arc is generated by comparing the output value of each filter 110*a* to 111 and the reference voltage and counting a result of the comparison, and generate power quality data of direct current flowing through the line 10 by providing a plurality of reference voltages to each of the filters 110*a* to 111. In addition, when it is determined that an arc is generated in the line 10, the arc determination unit 220 may block the direct current flowing through the line 10 by switching on the circuit breaker 300.

The determination method of the arc determination unit 260 includes 7) a method of determining that an arc is generated in the line 10 when all of the comparison results of the signal processing unit 210 are identified as arc detection, 8) a method of determining that an arc is generated in the line 10 when the number of times of determining as an arc is larger than the number of times of not determining as an arc, as a result of the comparison by the signal processing unit 210, 9) a method of determining that an arc is generated in the line 10 when the output value of the low-pass filter 110*a* is determined as generation of an arc although a result value determined as an arc is smaller than a result value not determined as an arc, as a result of the comparison by the signal processing unit 210, 10) a method of determining that an arc is generated in the line 10 when an FFT analysis result of the signal processing unit 210 is determined as an arc and at least one of the output values of the filters 110*a* to 111 is determined as an arc by prioritizing the FFT analysis result, and 11) a method of determining that an arc is generated in the line 10 when at least one arc is determined in the filters 110*a* to 110*n* other than the high-pass filter 111 by prioritizing the arc determination result of the high-pass filter 111.

Here, item 11) is a method that can be applied when the arc generated in the line 10 is mainly in a high band, and item 9) is a method that can be applied when the arc generated in the line 10 is mainly in a low band.

Since the frequency band of an arc may vary according to the line 10 to which the arc detector according to an embodiment is connected and a load connected to the line 10, it is preferable to detect an arc using one of the methods 7) to 11) suitable for the overall electrical system.

The methods according to an embodiment of the present invention described above may be manufactured as a program to be executed on a computer. In addition, the program may be stored in a computer-readable recording medium, and examples of the computer-readable recording medium include ROM, RAM, CD-ROM, magnetic tape, floppy disk, optical data storage device, and the like.

As the computer-readable recording medium is distributed to computer systems connected through a network, computer-readable codes may be stored and executed in a distributed manner. In addition, functional programs, codes, and code segments for implementing the methods may be easily inferred by programmers in the technical field to which the present invention belongs.

In addition, although the preferred embodiments of the present invention have been shown and described above, the present invention is not limited to the specific embodiments described above, and various modifications can be made by those skilled in the art without departing from the subject matters of the present invention claimed in the claims, and these modified implementations should not be understood separately from the technical spirit or perspective of the present invention.

The invention claimed is:

1. An apparatus for detecting arcs on a line, comprising:
a current sensor outputting a signal corresponding to current flowing through the line;
a circuit breaker; and
a plurality of filters including a low-pass filter, at least one band-pass filter, and a high-pass filter, the plurality of filters being configured to filter a signal output from the current sensor,
wherein the apparatus is configured to:
perform analog-to-digital conversion (ADC) and a frequency analysis for a low-\ band signal filtered by the low-pass filter,
compare an amplitude of a mid-band signal filtered by the at least one band-pass filter with a first reference value without performing the ADC and a frequency analysis for the mid-band signal to generate a first comparison result,
compare an amplitude of a high-band signal filtered by the high-pass filter with a second reference value different from the first reference value without performing the ADC and a frequency analysis for the high-band signal to generate a second comparison result, and
determine whether an arc occurs on the line based on a result of the frequency analysis for the low-band signal, the first comparison result, and the second comparison result, and
block direct current flowing through the line by switching on the circuit breaker when it is determined that an arc has occurred on the line.

2. The apparatus according to claim 1, wherein the apparatus is further configured to:
count a number of times exceeding the first or second reference value for each of the mid-band signal and the high-band signal, and
compare the counted number with a reference number.

3. The apparatus according to claim 1, wherein a frequency band of the at least one band-pass filter is partially overlapped with at least one of a frequency band of the low-pass filter and a frequency band of the high-pass filter.

4. The apparatus according to claim 1, wherein an excluded frequency band exists between a frequency band of the low-pass filter and a frequency band of the at least one band-pass filter.

5. The apparatus according to claim 2, wherein the apparatus is further configured to determine whether an arc occurs in the low-band signal based on a magnitude and a frequency of a pulse in an arc.

6. The apparatus according to claim 5, wherein the apparatus is further configured to:
determine that an arc occurs on the line when the counted number exceeds the reference number.

7. The apparatus according to claim 5, wherein, when the counted number is smaller than the reference number, the apparatus determines that an arc occurs on the line if it is determined that an arc occurs in the low-band signal.

* * * * *